Feb. 26, 1924.
S. Q. ZIMMERMAN
1,484,924
SECTIONAL CORE COLLAPSING DEVICE
Filed Sept. 22, 1920
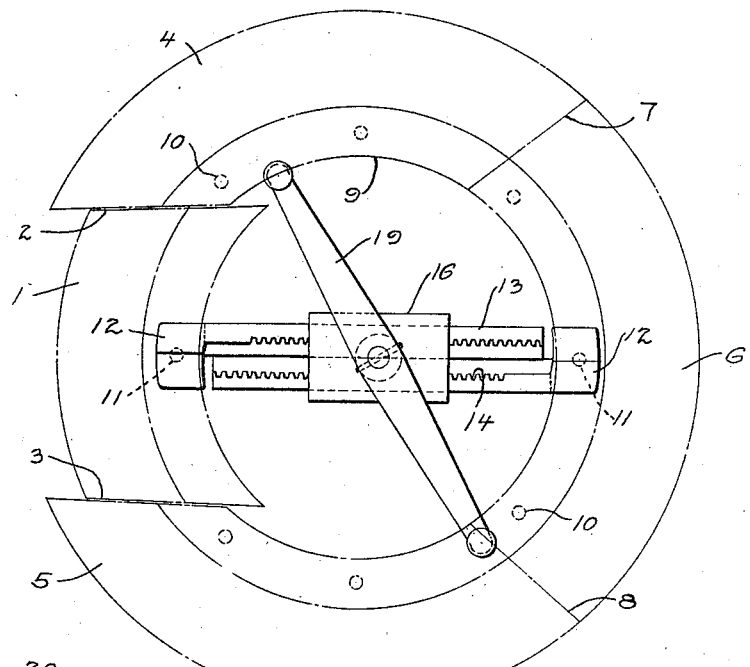
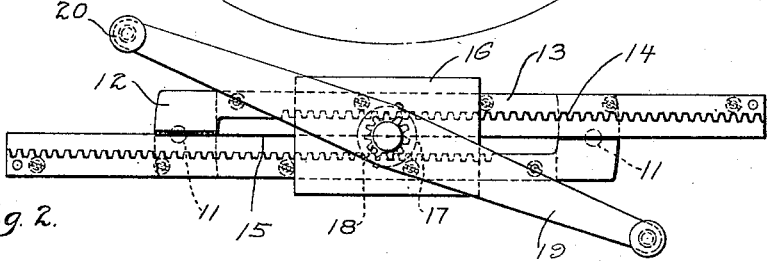
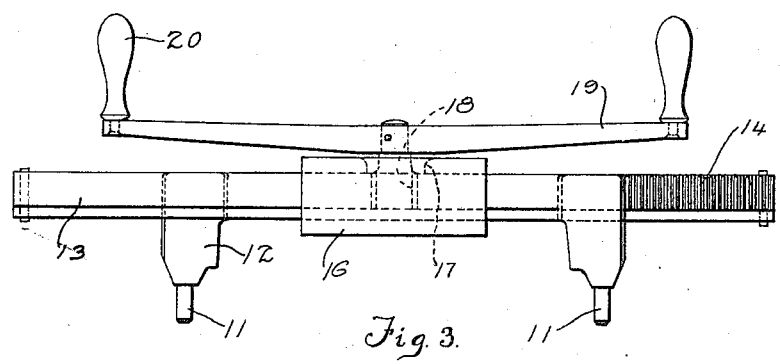
WITNESSES
INVENTOR.
Spencer Q. Zimmerman,
BY
Ernest Hopkinson
his ATTORNEY.

Patented Feb. 26, 1924.

1,484,924

UNITED STATES PATENT OFFICE.

SPENCER QUIGLE ZIMMERMAN, OF DETROIT, MICHIGAN, ASSIGNOR TO MORGAN & WRIGHT, A CORPORATION OF MICHIGAN.

SECTIONAL-CORE-COLLAPSING DEVICE.

Application filed September 22, 1920. Serial No. 411,922.

*To all whom it may concern:*

Be it known that I, SPENCER QUIGLE ZIMMERMAN, a citizen of the United States, residing at Detroit, county of Wayne, and State of Michigan, have invented certain new and useful Improvements in Sectional-Core-Collapsing Devices, of which the following is a full, clear, and exact description.

Straight side or quick detachable types of tires, which have inextensible beads, are often built up on cores having a plurality of sections which may be collapsed more or less by inward radial movement thereof. After curing, and after passing a tool circumferentially between the tire and the core to initially loosen the same, it has been customary heretofore to pry the sections apart. The tools used for this purpose were crude levers formed from bars with blunt ends. The workmen laboriously pried and tugged away with these until one section was removed. The remaining sections were then taken out piece by piece without much difficulty.

The present invention aims to provide a simple and efficient tool for accomplishing the collapsing of sectional cores with less labor and more expeditiously.

Briefly, the invention comprises core engageable members that may be brought together by a simple power multiplying mechanism that is located preferably to one side of the central plane of the core at the outset of an operation.

The invention is illustrated in the accompanying drawings, in which,

Fig. 1 is a plan view of the device of the present invention in working relation to a part-way collapsed core, and Figs. 2 and 3 are plan and side elevations respectively of the device itself.

In the drawings a typical core is illustrated with a section 1 having parallel sides 2 and 3 which permit it to be moved radially inward of the contiguous sections 4 and 5. A section 6 completes the continuity of the core. The lines of cleavage 7 and 8 between the sections 4, 5 and 6 are not parallel but more nearly radial as shown, it being comparatively easy to remove the sections 4, 5 and 6 after the section 1 has been pried out. A flange or projection 9 on the inner periphery of each section of the core usually projects inwardly beyond the tire beads and is accessible. It is preferably provided with a plurality of holes 10 to form engageable portions for the tool of the present invention.

The straight sided core section 1 may be initially collapsed or moved inward radially in the manner shown in Fig. 1 by pulling on members 11 in the form of pins that are adapted to enter the holes 10 in the flange of the core sections. Each of the members 11 projects from a lug 12 that is located laterally of a bar 13 provided with a longitudinally arranged rack 14. The lugs 12 are offset to one side of the bars 13 so as to locate the members 11 in a plane with the opposed meeting faces 15 of the bars for better resisting strains in service. The bars 13 may be constrained to move in parallelism by any suitable means such as the channeled block 16 which is apertured at 17 to receive a pinion 18. The pinion 18 is suitably proportioned to engage and simultaneously actuate in opposite directions the bars 13 and the core engageable members 11 carried thereby and any suitable means may be used to turn this pinion, a suitable device for the purpose being illustrated in the form of a lever or double crank 19 which is preferably made of a length to sufficiently multiply the power applied to the handles 20 to relieve the operator of heavy exertion.

In use, the operator positions the holding members 11 in diametrically opposed holes 10, as illustrated in Fig. 1, or after one of the sections has been removed by positioning the members 11, one in a hole 10 adjacent the free radial face of one of the core sections and the other in a more or less diametrically located hole on the opposite side of the opening in the core. In other words, the members 11 may operate on a diameter or on a chord of the opening in the core. When the members 11 have been positioned, the operator turns the crank 19 with one or both hands as the occasion requires, and withdraws a section of the core corresponding to that shown at 1 in the drawings. As before stated, after one section of the core has been removed, the others may be pulled out with more or less ease. But should removal of the remaining sections be troublesome, the tool of the present invention may be utilized as above intimated.

It will thus be seen that I have devised an exceedingly simple and powerful tool for facilitating the collapsing of sectional cores, and one that will relieve the operator of most, if not all, of the manual labor heretofore required which has been not inconsiderable. The device is durable, and is neither cumbersome nor difficult of manipulation.

While the construction illustrated and described in detail is deemed preferable, it is to be understood that changes may be made therein without departing from the principle underlying the invention. The interengagement of the members 11 with the flange of the core sections could obviously be affected in various other ways than by drilling holes 10 in the core, such, for instance, as by forming lugs on one side of the flange. Therefore reference should be had to the appended claim for an understanding of its scope.

Having thus described my invention, what I claim and desire to protect by Letters Patent is:

A device for collapsing sectional tire cores including in combination, members readily engageable with and disengageable from core sections, racks fixed to said members, a pinion cooperating with said racks, and means constraining said racks to move in parallelism, said pinion and crank being bodily and quickly removable for convenience in effecting an adjustment of the distance between the members engageable with the core sections.

Signed at Detroit, Michigan, this 16th day of September, 1920.

SPENCER QUIGLE ZIMMERMAN.